US012190408B2

(12) United States Patent
Agrawal et al.

(10) Patent No.: US 12,190,408 B2
(45) Date of Patent: Jan. 7, 2025

(54) PERSONALIZED DIGITAL CONTENT GENERATION

(71) Applicant: Motorola Mobility LLC, Chicago, IL (US)

(72) Inventors: Amit Kumar Agrawal, Bangalore (IN); Srikanth Raju, Sahakaranagar (IN); Rahul Bharat Desai, Hoffman Estates, IL (US); Renuka Prasad Herur Rajashekaraiah, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 43 days.

(21) Appl. No.: 17/957,903

(22) Filed: Sep. 30, 2022

(65) Prior Publication Data

US 2024/0112375 A1 Apr. 4, 2024

(51) Int. Cl.
*G06T 11/00* (2006.01)
*G06T 7/194* (2017.01)

(52) U.S. Cl.
CPC .............. *G06T 11/00* (2013.01); *G06T 7/194* (2017.01); *G06T 2200/24* (2013.01)

(58) Field of Classification Search
CPC ..... G06T 11/00; G06T 7/194; G06T 2200/24; G06T 11/60
See application file for complete search history.

(56) References Cited

U.S. PATENT DOCUMENTS

| 10,270,962 | B1 | 4/2019 | Stout |
| 10,803,726 | B2 | 10/2020 | Agrawal et al. |
| 11,443,553 | B1 | 9/2022 | Liu et al. |
| 2002/0107895 | A1* | 8/2002 | Timmer ................. G06F 16/40 705/26.1 |

(Continued)

FOREIGN PATENT DOCUMENTS

| CN | 105320514 A | * | 2/2016 |
| WO | 2017114581 A1 | | 7/2017 |

OTHER PUBLICATIONS

Vidya Setlur et al., Travel scrapbooks: Creating rich visual travel narratives, 2009, 2009 IEEE International Conference on Multimedia and Expo, pp. 1314-1317. (Year: 2009).*

(Continued)

*Primary Examiner* — Jeffery A Brier
(74) *Attorney, Agent, or Firm* — FIG. 1 Patents

(57) ABSTRACT

Techniques for personalized digital content generation are described and are implementable to generate digital content based on content that depicts a scene from one or more locations and content that depicts one or more individuals. The described implementations, for instance, enable generation of a personalized photo album for a user depicting the user at the one or more locations. The described implementations further enable generation of an itinerary including personalized digital content. In an example, an input including a location is received. Environment content is generated that depicts a scene of the location. User content is generated that includes a representation of one or more individuals.

(Continued)

Personalized content is then generated by incorporating the representation of the one or more individuals into the scene, and the personalized content is output for display. The personalized content is further usable to generate a personalized itinerary for a user.

20 Claims, 12 Drawing Sheets

(56) References Cited

U.S. PATENT DOCUMENTS

| | | | |
|---|---|---|---|
| 2012/0159337 A1* | 6/2012 | Travilla | G06Q 30/0631 715/738 |
| 2014/0130076 A1 | 5/2014 | Moore et al. | |
| 2014/0160019 A1 | 6/2014 | Anda et al. | |
| 2014/0184841 A1* | 7/2014 | Woo | H04N 23/57 348/218.1 |
| 2015/0186977 A1 | 7/2015 | Leonard et al. | |
| 2016/0142626 A1 | 5/2016 | Bostick et al. | |
| 2017/0004567 A1 | 1/2017 | Dutt et al. | |
| 2018/0032818 A1 | 2/2018 | Abraham et al. | |
| 2018/0211308 A1 | 7/2018 | Cheeks | |
| 2019/0102060 A1* | 4/2019 | Ishida | G06F 3/0483 |
| 2020/0090388 A1* | 3/2020 | Kamoda | H04N 23/61 |
| 2021/0248365 A1* | 8/2021 | Naderan | G06V 30/413 |
| 2022/0313077 A1 | 10/2022 | Singh et al. | |
| 2024/0111820 A1 | 4/2024 | Agrawal | |
| 2024/0112240 A1 | 4/2024 | Agrawal | |
| 2024/0112241 A1 | 4/2024 | Agrawal | |

OTHER PUBLICATIONS

Yan-Ying Chen et al., Travel Recommendation by Mining People Attributes and Travel Group Types From Community-Contributed Photos, 2013, IEEE Transactions on Multimedia, vol. 15, No. 6, pp. 1283-1295. (Year: 2013).*

Mickael Figueredo et al., From Photos to Travel Itinerary: A Tourism Recommender System for Smart Tourism Destination, 2018, 2018 IEEE Fourth International Conference on Big Data Computing Service and Applications (BigDataService), pp. 85-92. (Year: 2018).*

Phatpicha Yochum et al., An Adaptive Genetic Algorithm for Personalized Itinerary Planning, 2020, IEEE Access, vol. 8, pp. 88147-88157. (Year: 2020).*

Lutfia Septiningrum et al., Tourism Itinerary Design: User Experience Approach, 2022, 2022 International Conference Advancement in Data Science, E-learning and Information Systems (ICADEIS), pp. 01-05. (Year: 2022).*

Blackwood, Emily, "How to take a good selfie with your iPhone", Backlight [online] [retrieved Aug. 8, 2022]. Retrieved from the Internet <https://backlightblog.com/how-to-take-a-good-selfie>, Nov. 3, 2021, 15 Pages.

Fueneco, "Back Camera Selfie Pro", Fueneco [retrieved Aug. 8, 2022]. Retrieved from the Internet <https://play.google.com/store/apps/details?id=com.fueneco.backcameraselfiepro>., Feb. 2016, 3 Pages.

Google, "Google Photos Help", Google [retrieved Aug. 8, 2022]. Retrieved from the Internet <https://support.google.com/photos/answer/6128838?hl=en&co=GENIE.Platform%3DAndroid>., 3 Pages.

Google, "Travel Help", Google [retrieved Aug. 8, 2022]. Retrieved from the Internet <https://support.google.com/travel/answer/9098125?hl=en>, 3 Pages.

U.S. Appl. No. 17/957,455, filed Apr. 26, 2024, "Non-Final Office Action", U.S. Appl. No. 17/957,455, filed Apr. 26, 2024, 38 pages.

U.S. Appl. No. 17/957,455, "Final Office Action", U.S. Appl. No. 17/957,455, Oct. 22, 2024, 48 pages.

U.S. Appl. No. 17/957,955, "Non-Final Office Action", U.S. Appl. No. 17/957,955, Sep. 26, 2024, 33 pages.

U.S. Appl. No. 17/957,996, "Restriction Requirement", U.S. Appl. No. 17/957,996, Aug. 29, 2024, 7 pages.

Lindecrantz, Erik, et al., "Personalizing the customer experience: Driving differentiation in retail", McKinsey & Company <https://www.mckinsey.com/industries/retail/our-insights/personalizing-the-customer-experience-driving-differentiation-in-retail>, Apr. 28, 2020, 14 pages.

* cited by examiner

PERSONALIZED DIGITAL CONTENT GENERATION

BACKGROUND

The proliferation of modern devices with enhanced digital content capture capabilities has led to an increase in the availability of a variety of digital content captured at locations around the world. Accordingly, a user preparing for a trip is able to view photographs of locations that other people have taken. However, viewing photographs of other individuals fails to provide an idea of what it may look like if the user were at the location herself. Current ways for previewing content including a user are limited which can reduce user satisfaction and efficiency.

BRIEF DESCRIPTION OF THE DRAWINGS

Aspects of personalized digital content generation are described with reference to the following Figures. The same numbers may be used throughout to reference similar features and components that are shown in the Figures.

DETAILED DESCRIPTION

Figure 1:
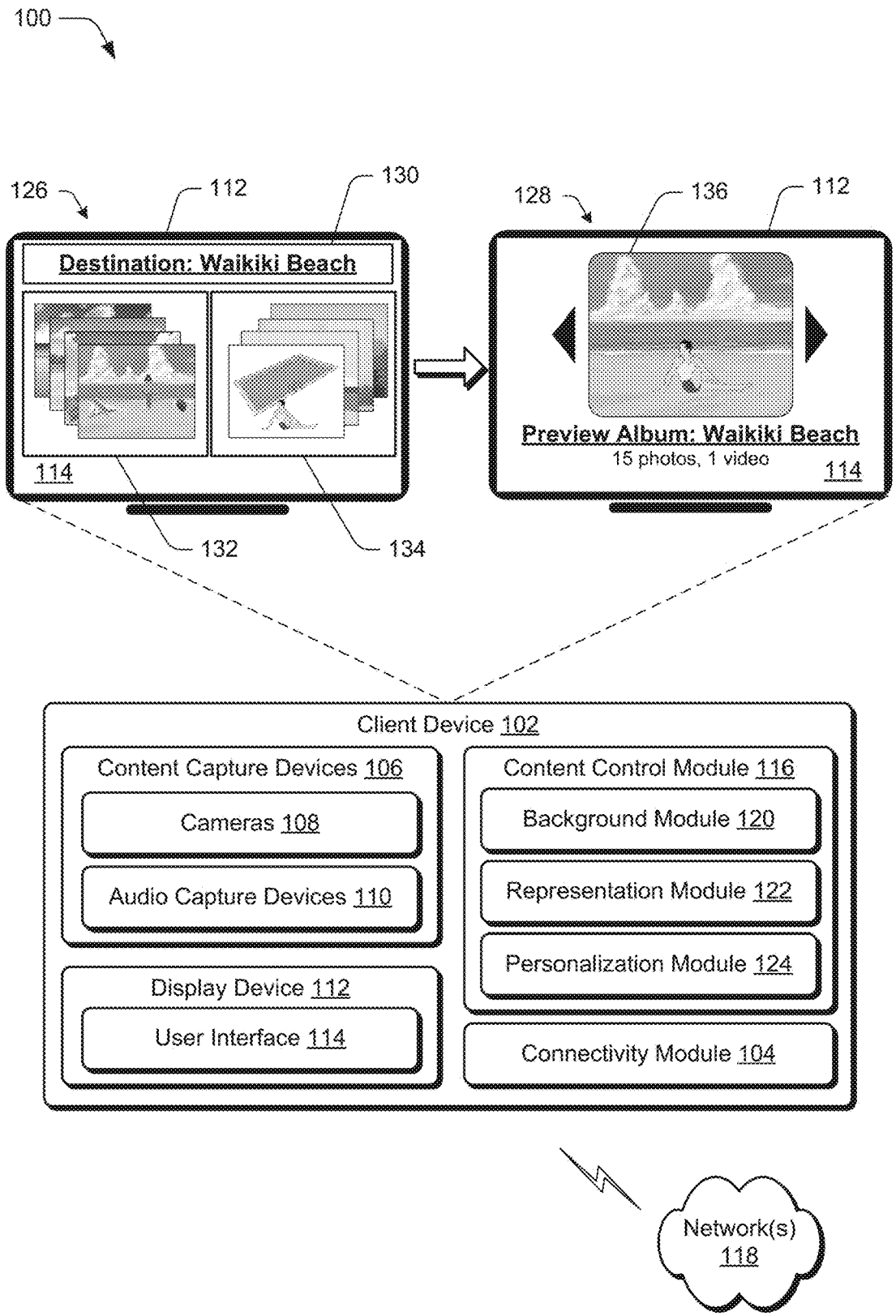
FIG. 1 illustrates an example environment in which aspects of personalized digital content generation can be implemented.

Techniques for personalized digital content generation are described and are implementable to automatically generate digital images and/or videos that incorporate one or more individuals into a scene from one or more locations. The described implementations, for instance, enable generation of a personalized digital content album for a user depicting the user at the one or more locations before the user visits the one or more locations. The described implementations further enable generation of a personalized itinerary including the personalized digital content.

According to various implementations, a client device includes a content control module that is operable to receive an input including at least one location. In various examples, the input is based on a user query, e.g., a request by a user in a user interface specifying the one or more locations. The input can further include additional criteria such as parameters that are usable in generating the personalized digital content as further described below. In an example, the parameters include one or more of a search radius around the one or more locations, a time range such as times of the day and/or days of the week/month/year, types/styles of digital content, one or more themes, itineraries including the one or more locations, or a selection of particular individuals to visit the one or more locations.

The content control module is further operable to detect the one or more locations and/or the parameters automatically and without user intervention. For instance, the one or more location is detected automatically as a destination of a mapping application, e.g., as input into Google Maps, Apple Maps, MapQuest, Waze, etc. In an additional or alternative examples, the content control module is operable to detect a variety of destination data that such as digital content that indicates upcoming travel to the one or more locations such as a lodging reservation, travel receipts, saved calendar events, various preconfigured itineraries, event tickets, and/or a transportation reservation. Consider, for instance, an example in which a user of the client device is planning an upcoming vacation and purchases airline tickets to Chicago, Illinois. The content control module is operable to detect the airline tickets, e.g., via an input from a travel booking system to the client device. Accordingly, in this example the location is determined to be Chicago, Illinois and one of the parameters includes a date range for the user's trip based on the detected tickets.

Based on the one or more locations, the content control module is configured to generate environment digital content. Generally, the environment digital content includes instances of digital content (e.g., photos, videos, augmented reality/virtual reality ("AR/VR") content, etc.) that depict a scene of the one or more locations. Various techniques for generating the environment digital content are considered. In one example, the environment digital content is received as input, e.g., as user input to the user interface. The environment digital content can also be compiled from digital content maintained in storage of the client device.

In various embodiments, the environment digital content is generated using one or more web-scraping techniques. For instance, the content control module is operable to employ one or more bots and/or web crawlers to compile various instances of digital content that represent scenes from the one or more locations. The content control module is further operable to acquire metadata associated with the instances of digital content, such as tags indicating what the digital content depicts, a geolocation, time of day, date, weather conditions, device capture settings, etc. associated with capture of the instances of digital content. The environment digital content can be generated based in part on such metadata as further described below. Continuing the above example in which the user is planning a trip to Chicago, the content control module is operable to initiate web-scraping techniques to collect various instances of digital content that include scenes from Chicago, as well as metadata associated with the digital content.

In various examples, the environment digital content is generated based in part on the one or more parameters, e.g., as specified by a user and/or detected automatically. For instance, the content control module is operable to filter digital content in accordance with the one or more parameters based on the collected metadata. In various examples, the content control module filters the environment digital content to include content that was captured within a search radius around the one or more locations, captured at a specific time of day, week, month, or year, includes tags indicating one or more themes, is a particular type and/or style of digital content, etc. For instance, in the above one of the parameters includes a date range for the user's trip to Chicago. Accordingly, the content control module is operable to filter the environment digital content based on the date range. Further, consider that one of the parameters indicates an "educational theme" for the user's trip. Accordingly, the content control module generates environment digital content in accordance with this theme such as photos including the Shedd Aquarium, Museum of Science and Industry, the Field Museum, etc.

The content control module is further operable to obtain user digital content. The user digital content includes instances of digital content that include a representation of one or more individuals, for instance a representation of the user of the client device and/or other individuals to visit the one or more locations. In one example, the user digital content is obtained as input to the client device, e.g., as input by a user in the user interface. In additional or alternative examples, the user digital content can be collected from a variety of locations, such as storage maintained on the client device, one or more external databases, social media sites, etc. The user digital content can also be filtered based on the one or more parameters and/or metadata such as tags indicating what the digital content depicts, a geolocation, time of day, date, weather conditions, device capture settings, etc. associated with capture of the instances of digital content. Continuing the above example, consider that the user is planning to visit Chicago in the winter. Accordingly, the content control module can filter the user digital content to include instances of digital content that depict the user in winter clothing.

The content control module is employed to generate personalized digital content based on the environment digital content and the user digital content. For instance, the content control module is operable to incorporate a representation of the one or more individuals from the user digital content into one or more scenes depicted by the environment digital content, e.g., such that the personalized digital content makes it look "as if the user were there." In various embodiments, the content control module leverages an artificial intelligence ("AI") based segmentation algorithm to generate the personalized digital content. By way of example, the content control module is operable to leverage the segmentation algorithm to remove one or more portions of scenes included in the user digital content. For instance, the content control module can remove a background from an instance of user digital content to extract the representation of the one or more individuals. In a similar manner, the content control module can remove one or more portions of scenes depicted by the environment digital content. For instance, the content control module can remove one or more individuals, animals, objects, etc. from an instance of environment digital content to extract a background image that depicts a scene of the one or more locations.

In various examples, the content control module is further configured to adjust visual properties of the environment digital content and/or the user digital content as part of generating the personalized digital content. For instance, the content control module is operable to adjust the sizing, location, positioning, contrast, exposure, lighting, resolution, etc. of portions of the environment digital content and/or the user digital content. In various examples, the content control module is operable to add visual effects and/or features, such as shadows, filters, blending, etc. to the user digital content and/or the environment digital content to improve photorealism in the resulting personalized digital content. By way of example, the content control module is operable to edit lighting and shadow conditions of the user digital content to accurately depict light sources in the environment digital content.

Once generated, the content control module is operable to output the personalized digital content, e.g., in a user interface of the client device. In various embodiments, the personalized digital content is configured as one or more albums that include a plurality of instances of personalized digital content. In one example, multiple albums are generated for display based on one or more specified themes, e.g., an educational album, a food album, a nightlife theme, a historical theme, a family friendly theme, an adventure album, etc. Returning to the above example, the content control module is operable to generate a personalized digital content album that includes instances of digital content that depicts the user in various scenes in Chicago in accordance with the educational theme, such as attending the Shedd Aquarium, at the Museum of Science and Industry, outside the Field Museum, etc. In this way, the techniques described herein are able to generate a variety of personalized digital content that enable a user to visualize how the user will look at a location that the user has not yet visited.

Further, the content control module is operable to generate a personalized itinerary based in part on the personalized digital content. The itinerary can include a specified time and specified location to obtain a digital content capture based on the personalized digital content. The itinerary can also include instances of the personalized digital content. Continuing the above example, consider that an instance of personalized digital content depicts the user standing in front of an exhibit in the Shedd Aquarium. The itinerary can include a time of day to visit the exhibit, along with a particular location (e.g., a geolocation) to stand to replicate the personalized digital content. In various examples, the itinerary further includes suggested device capture settings to configure the client device to obtain a content capture. Thus, the techniques described herein further instruct a user where, when, and how to capture content to replicate various personalized digital content.

Accordingly, using the techniques described herein, the client device is operable to automatically provide visual representations that depict an individual within scenes at particular locations, e.g., locations that the individual has not visited and/or plans to visit. These capabilities obviate a conventional limitation for a user to "imagine" what the user will look like at a particular location or use tedious post-production skills to synthetically create such digital content.

While features and concepts of personalized digital content generation can be implemented in any number of environments and/or configurations, aspects of personalized digital content generation are described in the context of the following example systems, devices, and methods.

FIG. 1 illustrates an example environment 100 in which aspects of personalized digital content generation can be implemented. The environment 100 includes a computing device such as a client device 102. The client device 102 can be implemented in a variety of different ways and form factors such as a mobile device, smartphone, tablet, wearable computing device, digital camera, laptop computer, desktop computer, webcam, a docked mobile device connected to a monitor, and so forth. These examples are not to be construed as limiting, however, and the client device 102 can be implemented in a variety of different ways and form factors. Example attributes of the client device 102 are discussed below with reference to the device 1000 of FIG. 10.

The client device 102 includes various functionality that enables the client device 102 to perform different aspects of personalized digital content generation discussed herein including a connectivity module 104, content capture devices 106 including cameras 108 and audio capture devices 110, a display device 112 including a user interface 114, and a content control module 116. The connectivity module 104 represents functionality (e.g., logic and hardware) for enabling the client device 102 to interconnect with other devices, databases, storage systems, and/or networks, such as via a network 118. The connectivity module 104, for instance, enables wireless and/or wired connectivity of the client device 102 as well as accessing content stored remotely, for instance "in the cloud."

The content capture devices 106 are representative of functionality to enable various types of media to be captured via the client device 102, such as visual media and audio media. In this particular example the content capture devices 106 include photo/video capture devices such as cameras 108 and audio capture devices 110. The content capture devices 106 can include a variety of devices that are able to capture various types of media in accordance with the implementations discussed herein. The content capture devices 106, for instance, include not only hardware for capturing associated media but also logic (e.g., drivers, firmware, etc.) for operating and configuring operation of the associated content capture devices 106. The display device 112 represents functionality (e.g., hardware and logic) for enabling visual output via the client device 102. For instance, via a user interface 114.

The content control module 116 represents functionality for performing various aspects of personalized digital content generation described herein and is illustrated as including a background module 120, a representation module 122, and a personalization module 124. The content control module 116 is operable to receive an input including one or more locations, e.g., detected automatically and without user intervention. Based on the one or more locations, the background module 120 is operable to generate environment digital content that includes one or more instances of digital content that depict a scene of the one or more locations. In an example, the background module 120 leverages webscraping techniques to generate the environment digital content.

The representation module 122 is employed to obtain user digital content that includes representations of one or more individuals. The personalization module 124 is employed to generate personalized digital content based on the user digital content and the environment digital content. In one or more examples, the personalization module 124 incorporates the representation of the one or more individuals from the user digital content into the one or more scenes depicted by the environment digital content, e.g., such that the personalized digital content appears "as if the user were there." Once generated, the content control module 116 is operable to output the personalized digital content, e.g., in the user interface 114. In various examples, the content control module 116 is further operable to generate a personalized itinerary that includes the personalized digital content. Accordingly, the techniques described herein can be leveraged to instruct a user where, when, and how to capture content to replicate various personalized digital content.

Example operations of personalized digital content generation are illustrated in FIG. 1 in a first stage 126 and a second stage 128. As shown in the first stage 126, a user of the client device 102 is planning an upcoming vacation and wishes to view digital content that depicts the user at the destination. The content control module 116 is operable to receive an input including a location 130, e.g., based on a user query. In the illustrated example, the location 130 is Waikiki Beach in Hawaii. The background module 120 is employed to generate a variety of environment digital content 132, for instance that depict scenes including Waikiki Beach. The representation module 122 is operable to obtain a variety of user digital content 134 that include representations of the user.

Progressing to second stage 128, the personalization module 124 is operable to generate an album 136, e.g., a personalized digital content album including personalized digital content based on the environment digital content 132 and the user digital content 134. In the illustrated example, the personalization module 124 is employed to segment portions of scenes depicted by the environment digital content 132 and the user digital content 134 as part of generating the personalized digital content. Subsequently, the personalization module 124 is operable to incorporate the representation of the user into the scenes of Waikiki Beach depicted by the environment digital content 132. In this way, the techniques described herein enable the user to efficiently preview digital content that provides a visual example of what the upcoming vacation may look like before actually visiting the location.

Having discussed an example environment in which the disclosed techniques can be performed, consider now some example scenarios and implementation details for implementing the disclosed techniques.

Figure 2:
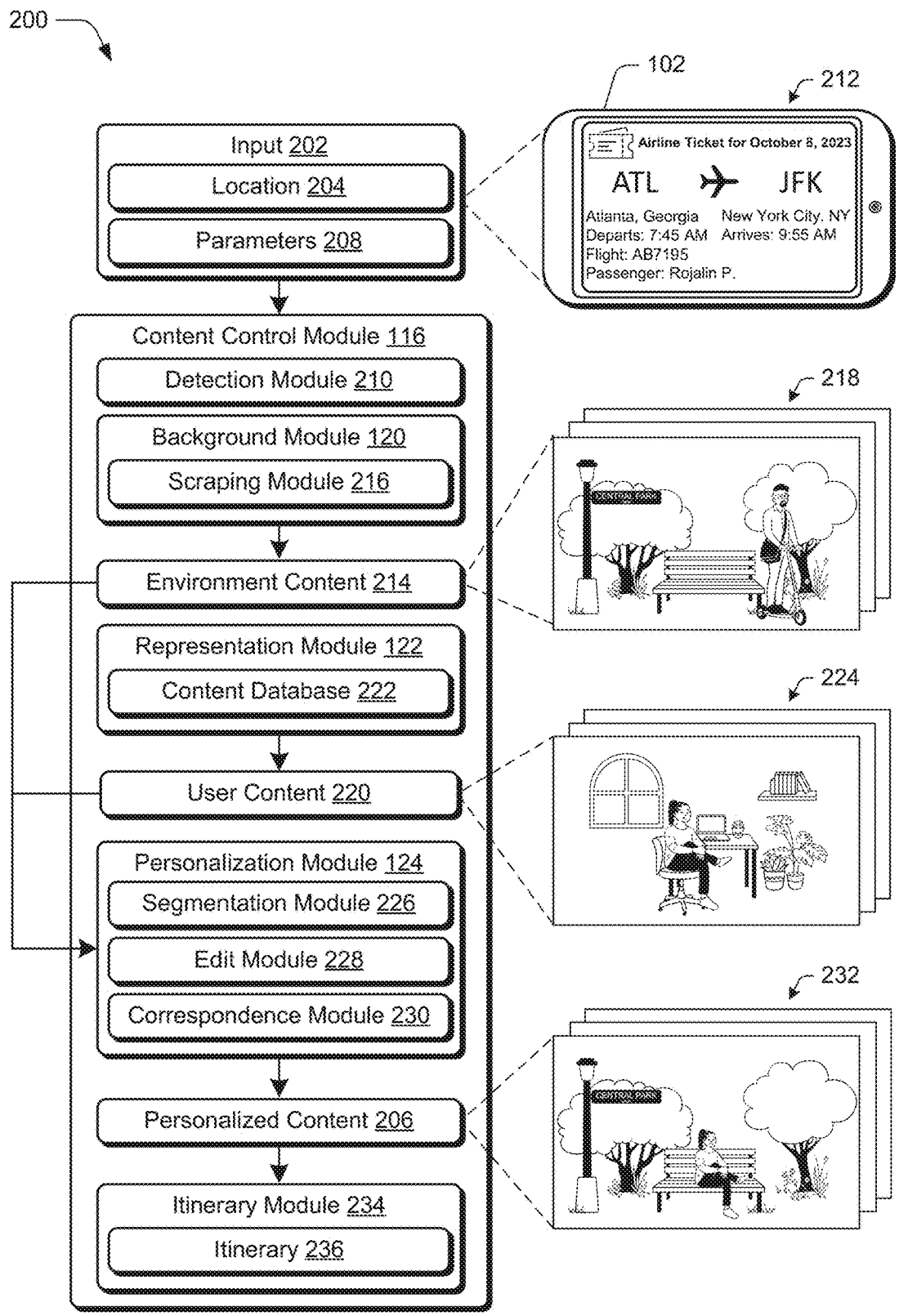
FIG. 2 depicts an example system for personalized digital content generation in accordance with one or more implementations.

FIG. 2 depicts an example system 200 for personalized digital content generation in accordance with one or more implementations. The system 200 can be implemented in the environment 100 and incorporates attributes of the environment 100 introduced above. In the example system 200, the content control module 116 receives an input 202 including at least one location 204, e.g., a location for which personalized content 206 is to be generated. The location 204 can be a geographical area (e.g., a country, state, city, etc.), a sight (e.g., a monument, attraction, viewpoint, vista, etc.), an address, GPS coordinates (a "geolocation"), a destination, etc. In an example, the location 204 is associated with a search radius, e.g., a distance radius within which the personalized content 206 is to be generated.

The input 202 can further include additional criteria such as one or more parameters 208 that can be used to generate the personalized content 206 as further described below. The parameters 208 can include one or more of a search radius around the one or more locations, a time range such as times of the day and/or days of the week/month/year, weather conditions, types and/or styles of digital content, itineraries including the one or more destinations, user input such as text inputs describing user preferences, or a selection of particular individuals to visit the one or more locations. In various example, the parameters 208 includes one or more "themes" such as an adventurous theme, historical theme, family friendly theme, nightlife theme, educational theme, food theme, etc. In various examples, the input 202 is based on a user query, e.g., a request by a user in the user interface 114 specifying the location 204 and/or the one or more parameters 208. In this way, the client device 102 can generate personalized content 206 that is custom tailored to specific user requests.

The input 202 can also be detected in whole or in part automatically and without user intervention. For instance, the content control module 116 includes a detection module 210 that is operable to detect the location 204 and/or the parameters 208. In one example, the detection module 210 is operable to detect the location 204 as a destination of a mapping application, e.g., as input into Google Maps, Apple Maps, MapQuest, Waze, etc. Various parameters 208 can also be extrapolated from mapping applications, such as a time range, theme, date, weather conditions, etc. This functionality is further discussed below with respect to FIG. 5.

In an additional or alternative examples, the detection module 210 is operable to detect the location 204 and/or parameters 208 based on various destination data and/or content that indicate travel to the location 204 such as a lodging reservation, travel receipts, saved calendar events, various preconfigured itineraries, event tickets, search history, and/or transportation reservations. For instance, the detection module 210 is operable to query various flight/travel booking applications, devices, systems etc. to detect the input 202. By way of example, as shown at 212 the input 202 is based in part on detection of an airline booking. In the illustrated example, a user of the client device 102 has purchased a plane ticket from Atlanta, Georgia to New York City, and thus the location 204 is determined to be New York City. The detection module 210 is further operable to detect additional parameters 208 based on the airline booking, such as a date for the travel (e.g., Oct. 8, 2023) a time of arrival (e.g., 9:55 AM) as well as an identity of an individual, for instance in this example the ticket is for "Rojalin P."

Based on the input 202, a background module 120 is operable to generate environment content 214. Generally, the environment content 214 includes instances of digital content (e.g., photos, videos, augmented reality/virtual reality ("AR/VR") content, etc.) that depict a scene of the one or more locations 204. Further, the environment content 214 can be generated in accordance with the parameters 208, e.g., to depict the location 204 at a particular time of day, year, month, etc., in accordance with one or more themes, as including instances of digital content within a search radius, etc.

The background module 120 is operable to generate the environment content 214 in a variety of ways. In one example, the environment content 214 is based on a user input to the user interface 114. Consider an example in which a user of the client device 102 has a specific scene in mind to generate the personalized content 206. In this example, the background module 120 is employed to receive as input a parameter 208 that includes a user input, e.g., a text input describing the desired scene. The background module 120 is employed to retrieve environment content 214 based on the text input, e.g., based on the description and/or search terms extracted from the text input. In some examples, the environment content 214 is retrieved from storage of the client device 102 and/or obtained from various sources accessed via the network 118 as further described below. Alternatively or additionally, the user is able to input a photo including the specific scene to be included in the environment content 214.

In one example, the environment content 214 is collected from various instances of digital content maintained in storage of the client device 102 and/or stored remotely such as "in the cloud." In various examples, the background module 120 is operable to employ facial recognition and/or image recognition strategies to generate the environment content 214. For instance, the background module 120 can employ facial recognition and/or image recognition techniques to identify individuals and/or features depicted in instances of digital content that indicate whether or not the content depicts the location 204.

In some embodiments, the background module 120 includes a scraping module 216 that is operable to generate the environment content 214 using one or more web-scraping techniques. For instance, the content control module is operable to employ one or more bots and/or web crawlers to compile various instances of digital content that represent scenes from the one or more locations 204, e.g., from one or more internet sources accessed via the network 118. The scraping module 216 is further operable to acquire metadata associated with the instances of digital content, such as tags indicating what the digital content depicts, a geolocation, time of day, date, weather conditions, device capture settings, etc. associated with capture of the instances of digital content. Accordingly, the environment content 214 can be generated based in part on such metadata, e.g., to adhere to the parameters 208. For instance, the background module 120 is operable to filter digital content in accordance with the one or more parameters 208 based on the collected metadata.

Continuing with the above example in which the user Rojalin P. is travelling to New York City, the background module 120 is configured to generate environment content 214 that depicts scenes from the location 204, in this example New York City. The background module 120 is further operable to filter the environment content 214 to include instances of digital content based on the date of the user's trip, e.g., Oct. 8, 2023. For instance, as shown at 218 the environment content 214 includes a photograph of Central Park in New York City captured in the fall that depicts a lamp pole, street sign, park bench, trees, and a man on a scooter.

The content control module 116 also includes a representation module 122 that is operable to generate user content 220. Generally, the user content 220 includes instances of digital content (e.g., photos, videos, AR/VR content, etc.) that include a representation of one or more individuals such as representation of the user of the client device 102. In another example, the user content 220 includes representations of more than one individual, such as multiple individuals to visit the one or more locations as specified by the parameters 208. In one example, the user content 220 is obtained as input to the client device 102, e.g., as input by a user in the user interface 114. In additional or alternative examples, the user content 220 can be collected from a variety of locations, such as via a content database 222 maintained on the client device 102, one or more external databases, social media sites, acquired over the network 118, etc. In various examples, the representation module 122 is operable to employ facial recognition and/or image recognition strategies to generate the user content 220. For instance, the representation module 122 can employ facial recognition and/or image recognition techniques to identify specific individuals and/or features depicted in instances of digital content.

The representation module 122 is also operable to filter and refine the user content 220 based on the one or more parameters 208 and/or metadata associated with the user content 220 such as descriptive tags, how "recent" the content is, user poses and/or body positions, a geolocation, time of day, date, weather conditions, device capture settings associated with capture of the content, etc. Consider an example in which a parameter 208 indicates that the user is to visit the location 204 in the fall when the weather is pleasant and sunny. The representation module 122 is operable to generate user content 220 that depicts the user in fall clothing, e.g., based on time stamps associated with the user content 220, using image recognition techniques to identify clothing worn by the user, etc. In this way, the techniques described herein increase computational efficiency by filtering out digital content likely not to be of interest to a user as well as increase user satisfaction by generating personalized content 206 with increased realism. As shown at 224 of the illustrated example, the user content 220 includes a variety of instances of digital content that depict the user. In this example, an instance of the user content 220 depicts the user of the client device 102, Rojalin P., sitting down at a desk and wearing fall apparel, e.g., pants and a long sleeve shirt.

Based on the environment content 214 and the user content 220, a personalization module 124 is employed to generate personalized content 206. Generally, the personalized content 206 includes at least one instance of digital content that incorporates the one or more individuals from the user content 220 into one or more scenes depicted by the environment content 214, e.g., such that the personalized content 206 makes it look "as if the user were there." In various examples, the personalization module 124 generates the personalized content 206 based in part on the parameters 208, e.g., in accordance with one or more themes, types/styles of digital content, search radius, time of the day/week/month/year, etc. A variety of image processing techniques are considered and employed by the personalization module 124 to generate the personalized content 206.

By way of example, the personalization module 124 includes a segmentation module 226 that is operable to segment one or more portions of scenes included in the user content 220 and/or one or more portions of scenes included in the environment content 214. For instance, the content control module can remove one or more individuals, animals, objects, etc. from an instance of environment digital content to extract a background image that depicts a scene of the location 204 as further described with respect to FIG. 3b. Similarly, the segmentation module 226 is further operable to remove a background from an instance of user content 220 to extract the representation of the one or more individuals as further described below with respect to FIG. 3c. In some examples, the segmentation module 226 is employed to segment a portion of an individual, e.g., a face, head, upper body, etc. as further described below with respect to FIG. 4. In various implementations, the segmentation module 226 leverages an artificial intelligence ("AI") based segmentation algorithm to generate the personalized content 206, e.g., to segment portions of the user content 220 and/or the environment content 214.

In various embodiments, the personalization module 124 includes an edit module 228 that is employed to adjust visual properties of the environment content 214 and/or the user content 220 as part of generating the personalized content 206. For instance, the edit module 228 is operable to adjust the sizing, location, positioning, contrast, exposure, lighting, resolution, etc. of portions of the environment content 214 and/or the user content 220. In various examples, the content control module is operable to add visual effects and/or features, such as shadows, filters, blending, etc. to the user content 220 and/or the environment content 214. By way of example, the edit module 228 is operable to edit lighting and shadow conditions of the user content 220 to accurately react to light sources detected in the environment content 214. In this way, the user content 220 and the environment content 214 can be integrated with enhanced photorealism.

In some implementations, the personalization module 124 includes a correspondence module 230 that is operable to generate a correspondence score between instances of the user content 220 and instances of the environment content 214. Generally, the correspondence score represents a degree of similarity between the user content 220 and the environment content 214. By way of example, an instance of user content 220 that depicts a user in a swimsuit may have a relatively high correspondence score with an instance of environment content 214 that depicts a scene including a beach or pool. Conversely, the same instance of user content 220 may have a low correspondence score with an instance of environment content 214 that depicts a scene including a snowy vista. The correspondence module 230 can generate correspondence scores based on various metadata associated with the user content 220 as well as various metadata associated with the environment content 214 as described above. Thus, the personalization module 124 is operable to generate the personalized content 206 based in part or in whole on the correspondence scores, thus leading to increased photorealism of the personalized content 206.

Using the above and other techniques, the personalization module 124 is operable to generate one or more instances of personalized content 206. In an example, the personalized content 206 is configured as one or more albums including a plurality of instances of personalized content 206. For instance, the one or more albums are generated for display based on one or more of the parameters 208. In an example, the albums are generated based on one or more themes, e.g., an educational album, a food album, a nightlife album, a historical album, an adventure album, etc. as further described below with respect to FIG. 6 and FIG. 7. This is by way of example and not limitation, and albums can be generated based on one or more other parameters 208 such as a time of year, digital content styles, weather, digital content types, etc. Once generated, the content control module 116 is operable to output the personalized content 206, e.g., in a user interface 114 of the client device 102. As shown at 232, for instance, one instance of the personalized content 206 is a photograph that depicts Rojalin P. sitting on a park bench in Central Park. Accordingly, the techniques described herein support generation of a variety of personalized content 206 that enable visualization of how a particular user will look at a location 204, even where the user has not yet been to the location 204.

In various embodiments, an itinerary module 234 is further able to generate a personalized itinerary 236 based on the personalized content 206. In an example, the itinerary 236 includes a specified time and specified location to obtain a digital content capture based on the personalized content 206. For instance, the itinerary can include an optimal time to obtain a digital content capture that replicates an instance of the personalized content 206. The itinerary can also include instances of the personalized content 206. In some implementations, the itinerary can further include recommended device capture settings, e.g., instructions on how to configure the content capture devices 106 to effectively recreate a given instance of personalized content 206 as further discussed with respect to FIG. 8. For instance, the recommended device configuration settings can include whether to use a front camera or a rear camera of a client device 102, whether to capture digital content in a landscape or portrait orientation, and/or whether/how to apply visual effects such as an aperture size, shutter speed, ISO, brightness settings, flash setting, night mode, exposure setting, image filter, contrast setting, etc.

The itinerary can be generated based on a variety of considerations, such as the location 204, the parameters 208, demographic information associated with a user of the client device 102, metadata associated with the user content 220 and/or the environment content 214, etc. In at least one example, the itinerary 236 is generated based on feedback from a user, e.g., user input to approve or decline instances of the personalized content 206 for inclusion in the itinerary. Thus, the techniques described herein further instruct a user where, when, and how to capture content to replicate various instances of personalized content 206.

Figure 3A:
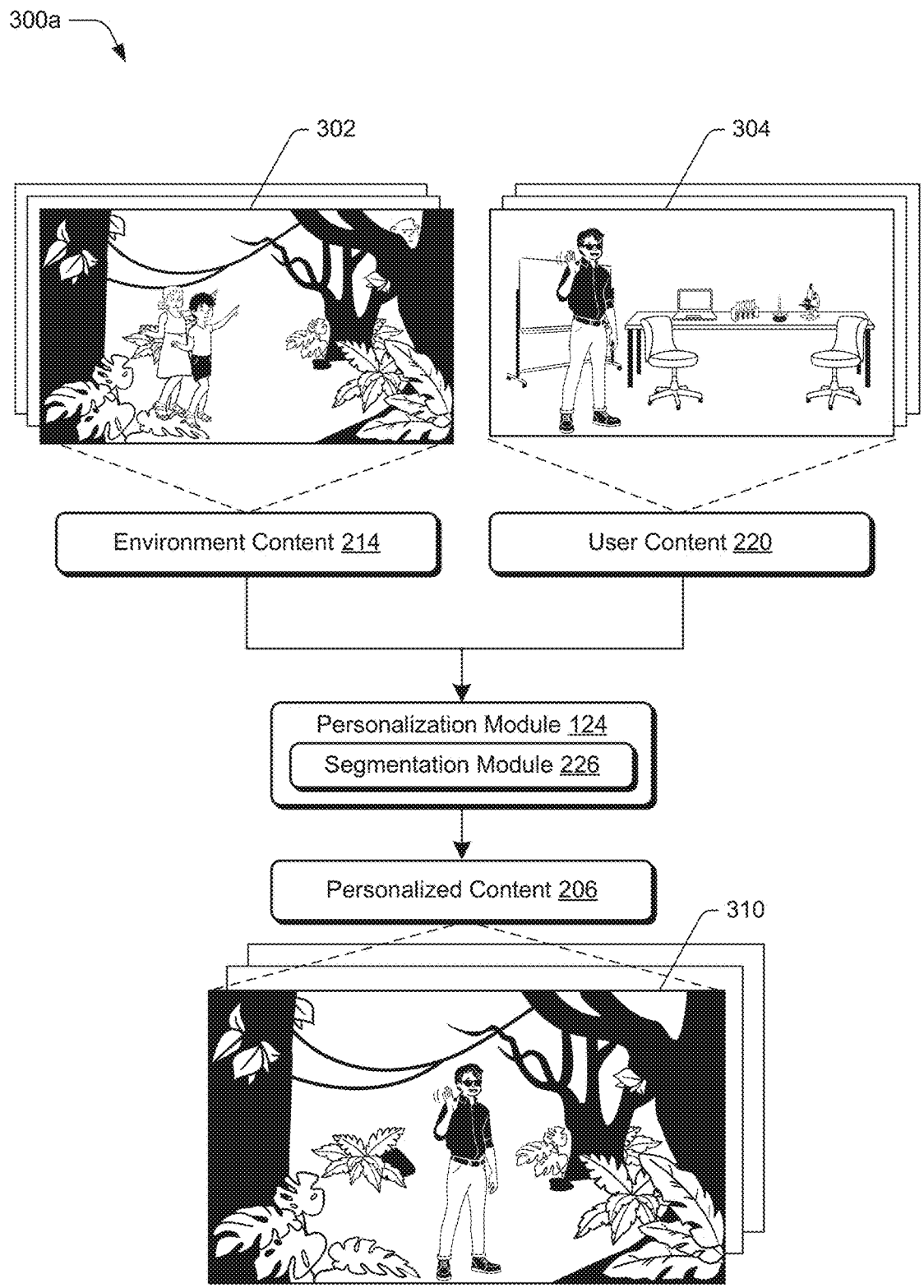
FIGS. 3a, 3b, and 3c depict example implementations for personalized digital content generation depicting segmentation of environment content and user content in accordance with one or more implementations.
Figure 3B:
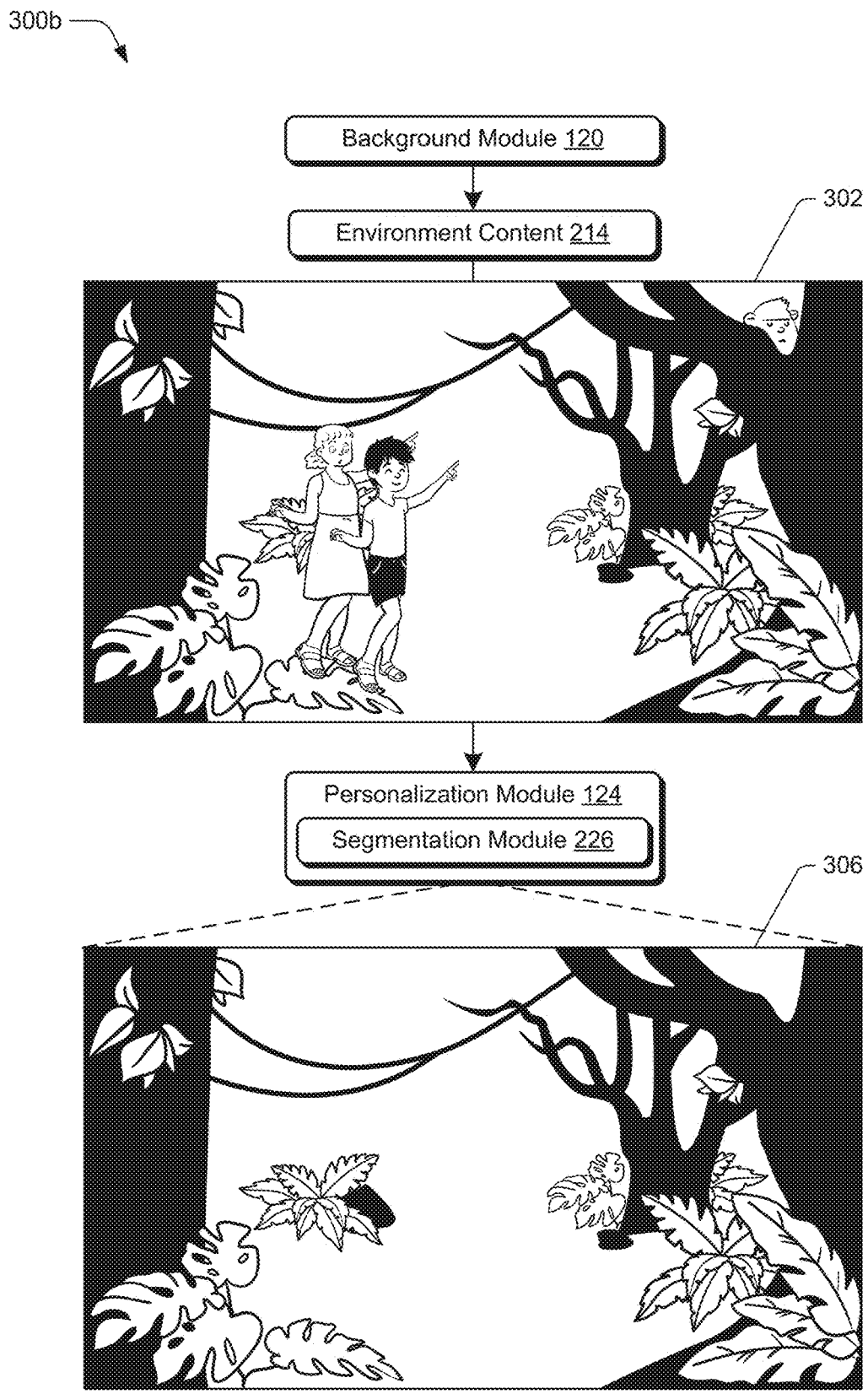
Figure 3C:
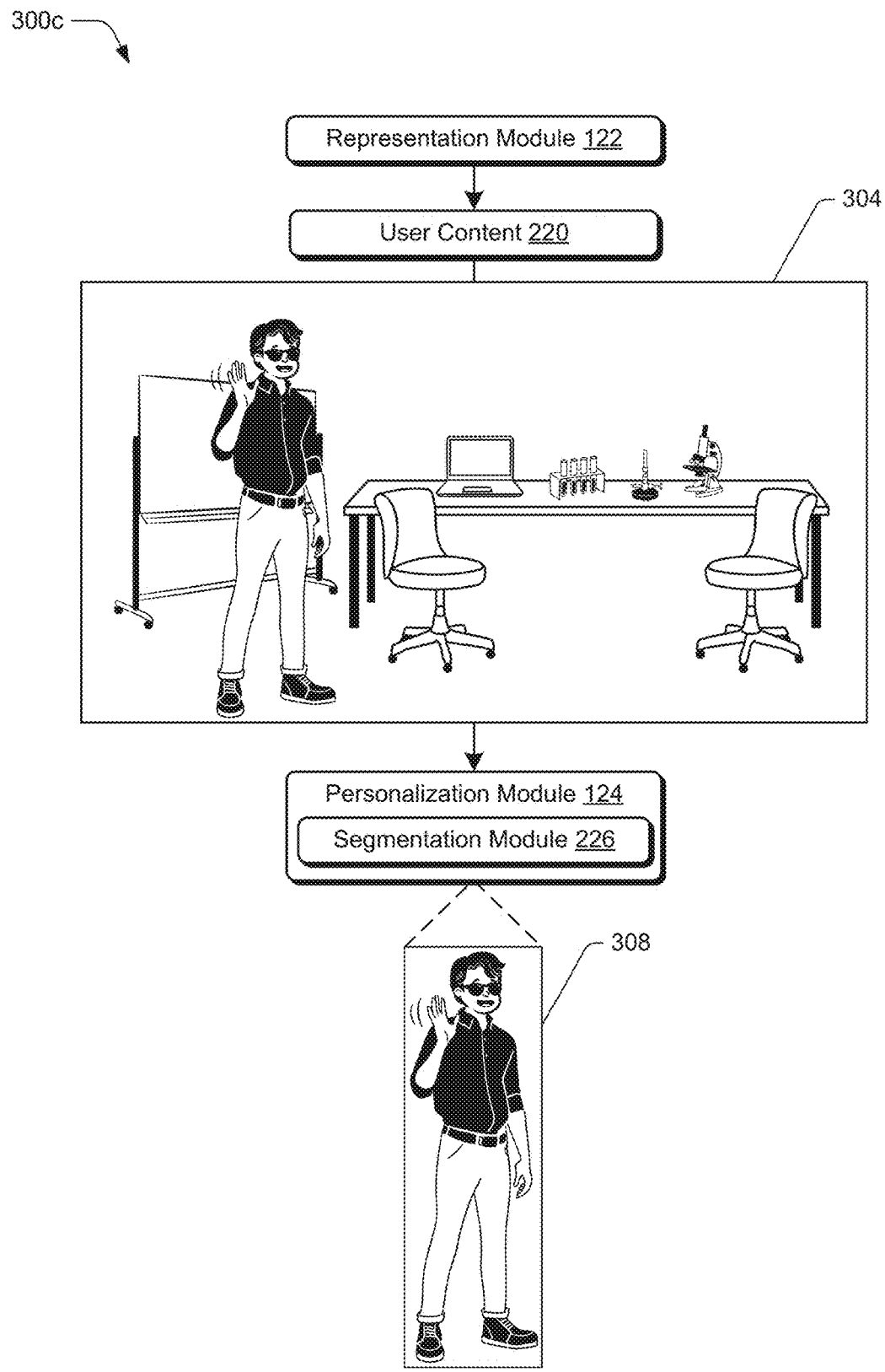

FIGS. 3a, 3b, and 3c depict example implementations 300a, 300b, and 300c for personalized digital content generation depicting segmentation of environment content and user content in accordance with one or more implementations. For instance, in example implementation 300a of FIG. 3a, a personalization module 124 receives environment content 214. In this example, the environment content 214 depicts a location 204 including a jungle. Accordingly, a first digital image 302 included in the environment content 214 depicts two children looking at a monkey in the jungle scene. The personalization module 124 also receives user content 220, which in this example includes a second digital image 304. The second digital image 304 depicts a single individual, for instance a man standing and waving in a classroom.

The personalization module 124 includes a segmentation module 226 that is operable to remove one or more portions of scenes depicted by the environment content 214 and the user content 220. In this example, the segmentation module 226 leverages an artificial intelligence ("AI") based segmentation algorithm to generate the personalized content 206, e.g., to segment portions of the user content 220 and the environment content 214. Accordingly, as illustrated in FIG. 3b, the segmentation module 226 is operable to remove the two children and the monkey from the jungle scene to generate a first segmented digital image 306. In this way, the personalization module 124 generates a representation of the scene the depicts the background, e.g., the jungle.

Further, the segmentation module 226 is operable to remove a background from an instance of user content 220 to extract the representation of the one or more individuals. As shown in FIG. 3c, the segmentation module 226 is operable to generate a second segmented digital image 308 that includes the waving man without the representation of the classroom. Returning to FIG. 3a, the personalization module 124 is operable to generate personalized content 206 using the first segmented digital image 306 and the second segmented digital image 308. Accordingly, the personalized content 206 in this example includes a personalized image 310, which depicts the waving man in the jungle scene, without depicting the children or the monkey. Accordingly, through use of the AI based segmentation algorithm, the techniques described herein enable efficient and realistic generation of personalized digital content.

Figure 4:
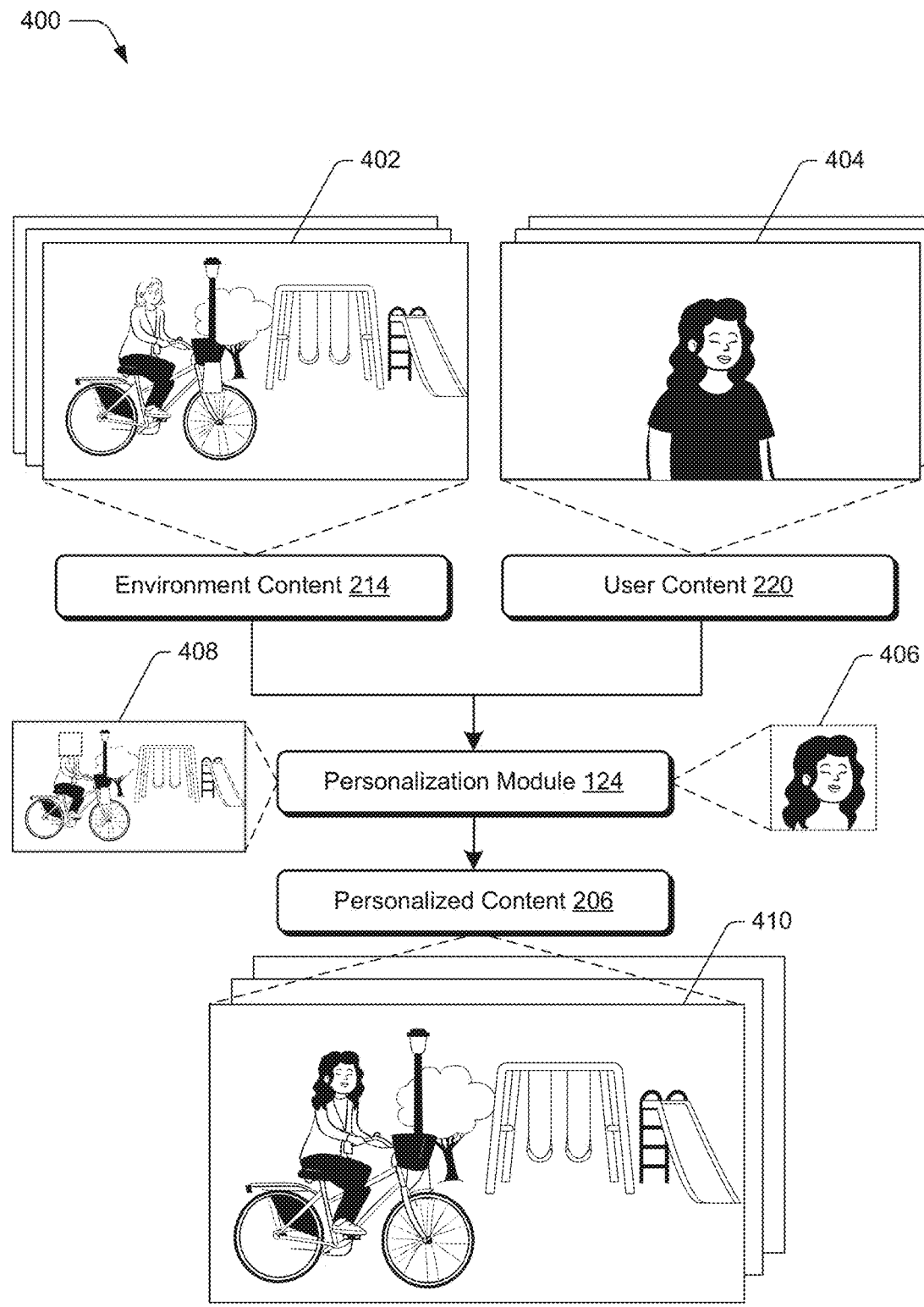
FIG. 4 depicts an example implementation personalized digital content generation depicting a further example of segmentation of environment content and user content in accordance with one or more implementations.

FIG. 4 depicts an example implementation 400 for personalized digital content generation depicting a further example of segmentation of environment content and user content in accordance with one or more implementations. In the illustrated example, the personalization module 124 receives environment content 214 depicting a park scene. For instance, the environment content 214 includes an image 402 that depicts a woman with light hair riding a bicycle in the park. The personalization module 124 also receives user content 220 that includes representations of a woman with dark hair. For instance, the user content 220 includes an image 404 that depicts the dark-haired woman from the waist up.

Similar to the above example, the personalization module 124 includes a segmentation module 226 that is operable to remove one or more portions of scenes depicted by the environment content 214 and the user content 220. However, in this example, the image 404 does not depict the entire body of the dark-haired woman. Thus, incorporation of a representation including just a torso and head would be impractical. Accordingly, the segmentation module 226 is employed to segment a portion of the representation of the dark-haired woman depicted in the image 404. For instance, the segmentation module 226 segments a head region of the light-haired woman as shown in a first segmented image 406. The segmentation module 226 also segments a portion of the representation of the light-haired woman depicted in the image 402. For instance, the segmentation module 226 segments and removes a head region of the light-haired woman as shown in a second segmented image 408.

The personalization module 124 is operable to generate personalized content 206 based on the first segmented image 406 and the second segmented image 408. Accordingly, the personalized content 206 in this example includes a personalized image 410 that depicts the dark-haired woman riding the bicycle in the park. Accordingly, the techniques described herein support extensive combinations of environment content 214 and user content 220 thus facilitating enhanced versatility in generation of a variety of personalized content 206.

Figure 5:
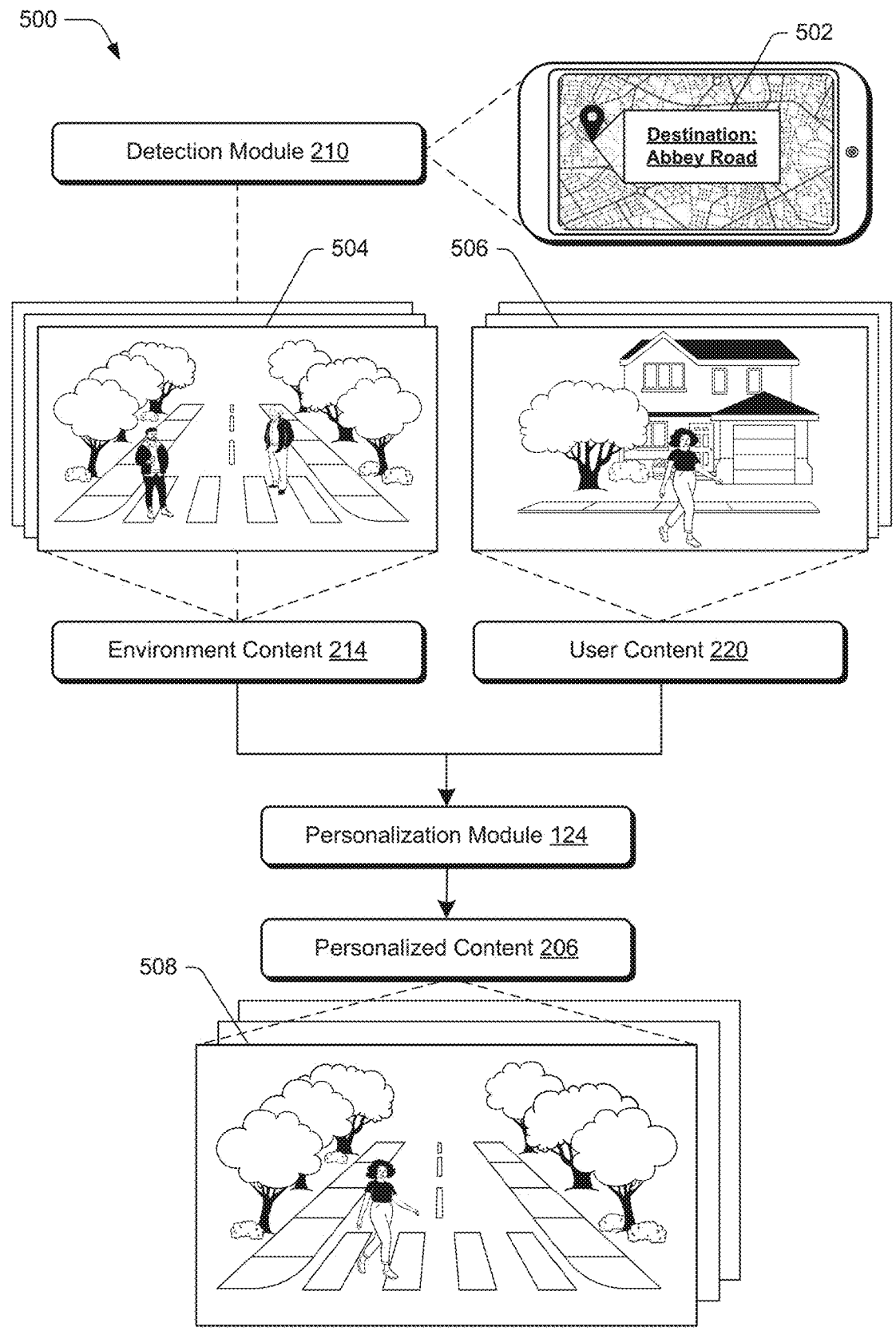
FIG. 5 depicts an example implementation personalized digital content generation in which a location is determined automatically and without user intervention in accordance with one or more implementations.

FIG. 5 depicts an example implementation 500 for personalized digital content generation in which a location is determined automatically and without user intervention in accordance with one or more implementations. In this example, a user of a mobile device has input a destination 502 into a mapping application, in this case the destination is "Abbey Road." The content control module 116 includes a detection module 210 that detects a location 204 based on the input into the mapping application, and accordingly the location 204 is determined to be Abbey Road.

In accordance with the techniques described in further detail above, the personalization module 124 receives environment content 214 that is based on the location 204. For instance, the environment content 214 in this example includes an image 504 that depicts two men standing in a crosswalk. The personalization module 124 further receives user content 220 that includes representations of a woman with curly dark hair. For instance, the user content 220 includes an image 506 that depicts the dark-haired woman walking in front of a house. The personalization module 124 is operable to generate personalized content 206 automatically and without user intervention based on the environment content 214 and the user content 220. Thus, an image 508 included in the personalized content 206 depicts the dark-haired woman walking across the crosswalk. In this way, the techniques described herein support automatic generation of personalized digital content.

Figure 6:
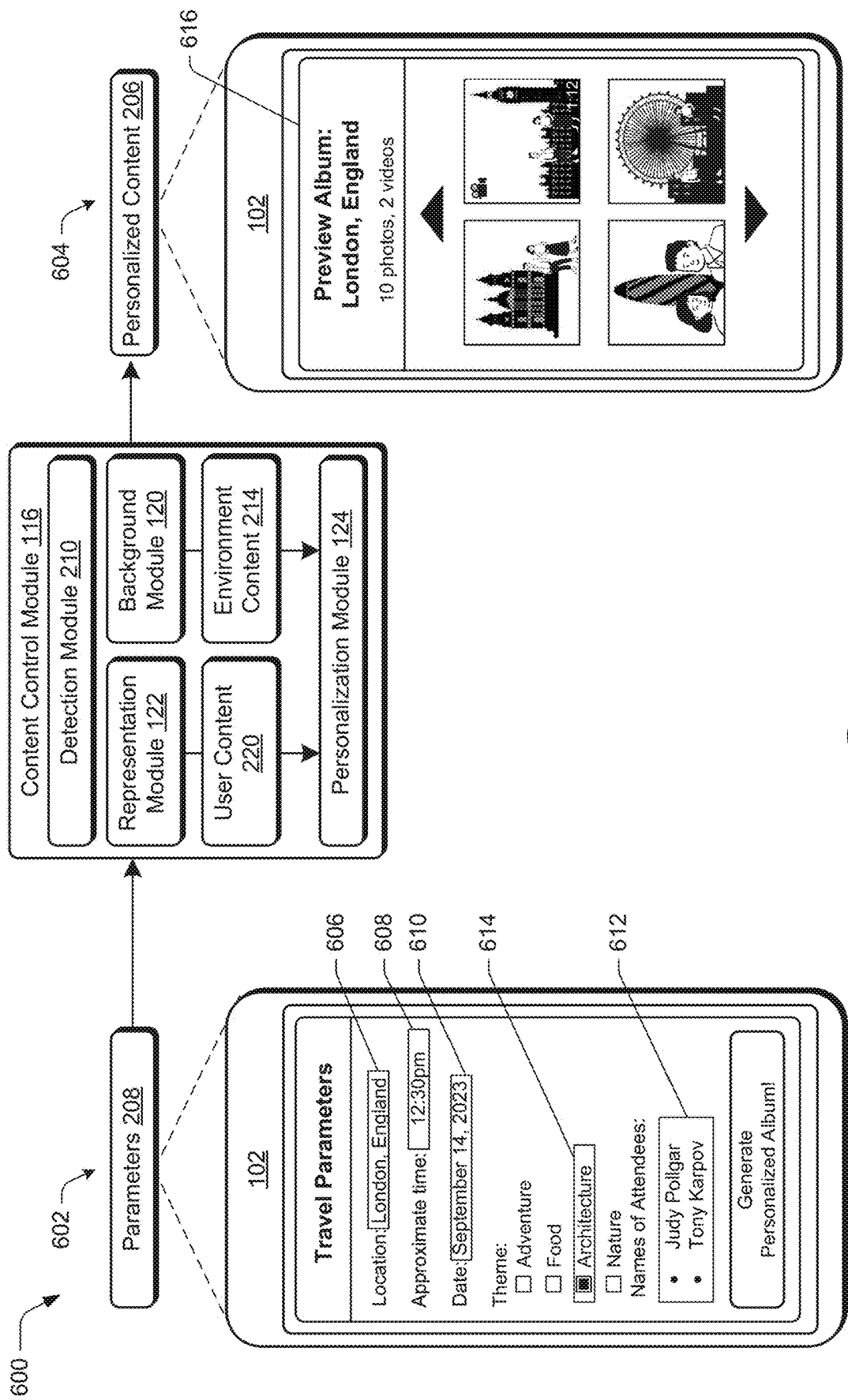
FIG. 6 depicts an example implementation for personalized digital content generation in which the personalized content is based in part on a theme in accordance with one or more implementations.

FIG. 6 depicts an example implementation 600 for personalized digital content generation in which the personalized content is based in part on a theme in accordance with one or more implementations. In this example, shown in a first stage 602 and a second stage 604, the content control module 116 is operable to receive an input 202 including parameters 208. As shown in the first stage 602, the input 202 is a user query that specifies a location 606, which in this example is London, England. The user query further includes parameters 208 specifying an approximate time 608, a date 610, and the names of two individuals 612. The parameters 208 further include a user specified theme 614, in this example an "architecture" theme.

Accordingly, the personalization module 124 is operable to generate personalized content 206 based in part on the parameters 208 in accordance with the techniques described above. For instance, the background module 120 is operable to generate environment content 214 that depicts various scenes including architecture around London. Further, the environment content 214 can be filtered based on the date 610, as well as the approximate time 608. The representation module 122 is also operable to generate user content 220 based on the parameters 208, for instance based on the approximate time 608, the date 610, and to include representations of the two individuals 612. Thus, as shown at second stage 604, the personalized content 206 includes an album 616 that includes various sample images and videos that depict the individuals 612 with notable London architecture sites in the background, e.g., the Big Ben clock tower, the London Eye Ferris wheel, the "Gherkin" building at 30 St. Mary Axe, and St. Paul's cathedral.

Figure 7:
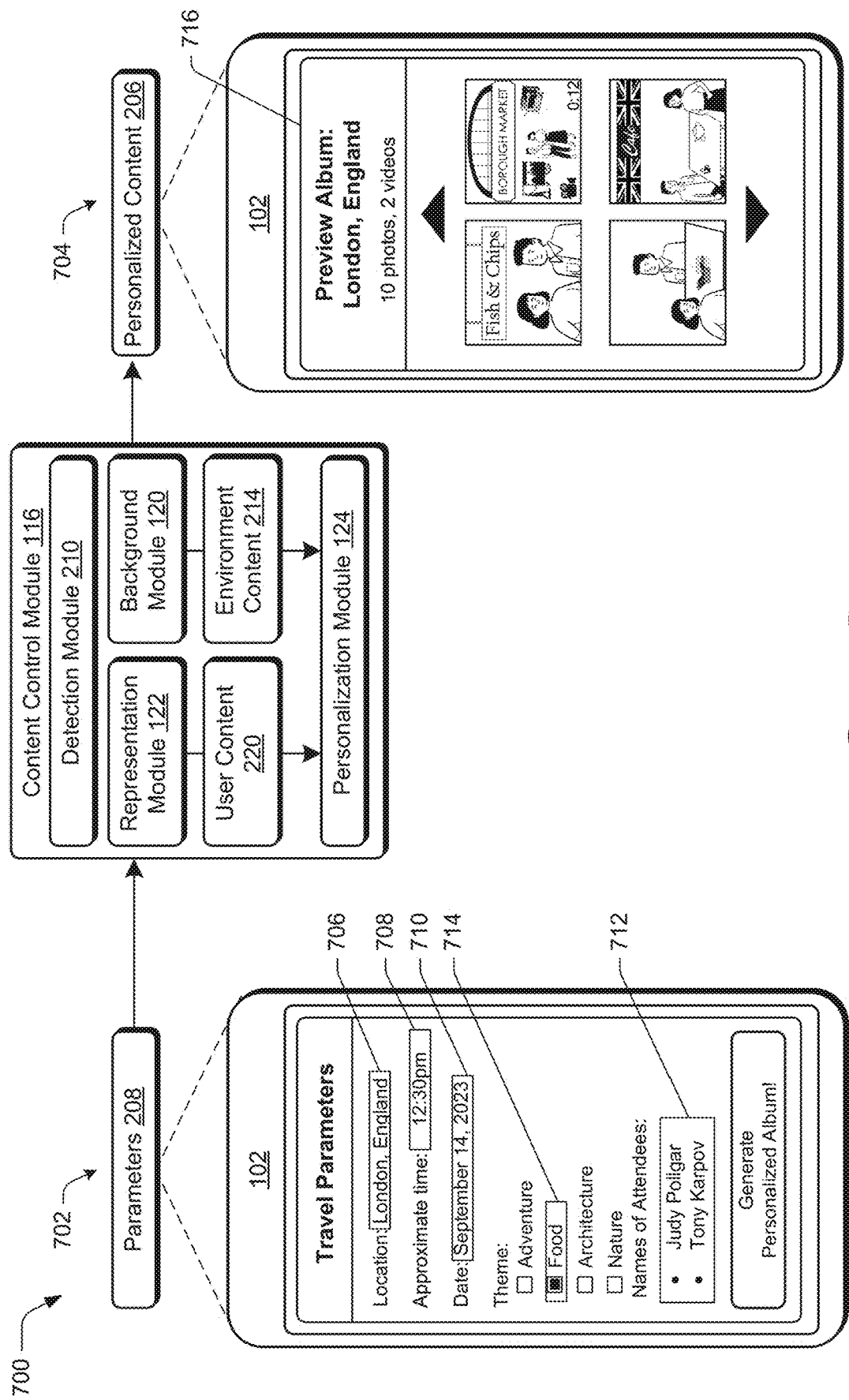
FIG. 7 depicts an example implementation for personalized digital content generation in which the personalized content is further based in part on a theme in accordance with one or more implementations.

FIG. 7 depicts an example implementation 700 for personalized digital content generation in which the personalized content is further based in part on a theme in accordance with one or more implementations. In this example, shown in first stage 702 and second stage 704, the content control module 116 is operable to receive an input 202 including parameters 208. As shown in first stage 702, the input 202 is a user query that specifies the location 706, which in this example is London, England. The user query further includes parameters 208 specifying an approximate time 708, a date 710, and the names of two individuals 712 similar to the above example depicted in FIG. 6. However, in this example the parameters 208 include a specification for a "food" theme 714 rather than an "architecture" theme.

Accordingly, the personalization module 124 is operable to generate personalized content 206 based in part on the parameters 208 in accordance with the techniques described above. For instance, the background module 120 is operable to generate environment content 214 that depicts various food-related scenes around London. Further, the environment content 214 can be filtered based on the approximate time 708 as well as the date 710. The representation module 122 is also operable to generate user content 220 based on the parameters 208, for instance based on the approximate time 708, the date 710, and to include representations of the two individuals 712. Thus, as shown at second stage 704, the personalized content 206 includes a preview album 716 that includes various sample images and videos that depict the individuals 712 in food-related scenes around London, e.g., at a "fish and chips" restaurant, at a café drinking tea, eating British cuisine, and visiting a well-known market.

Figure 8:
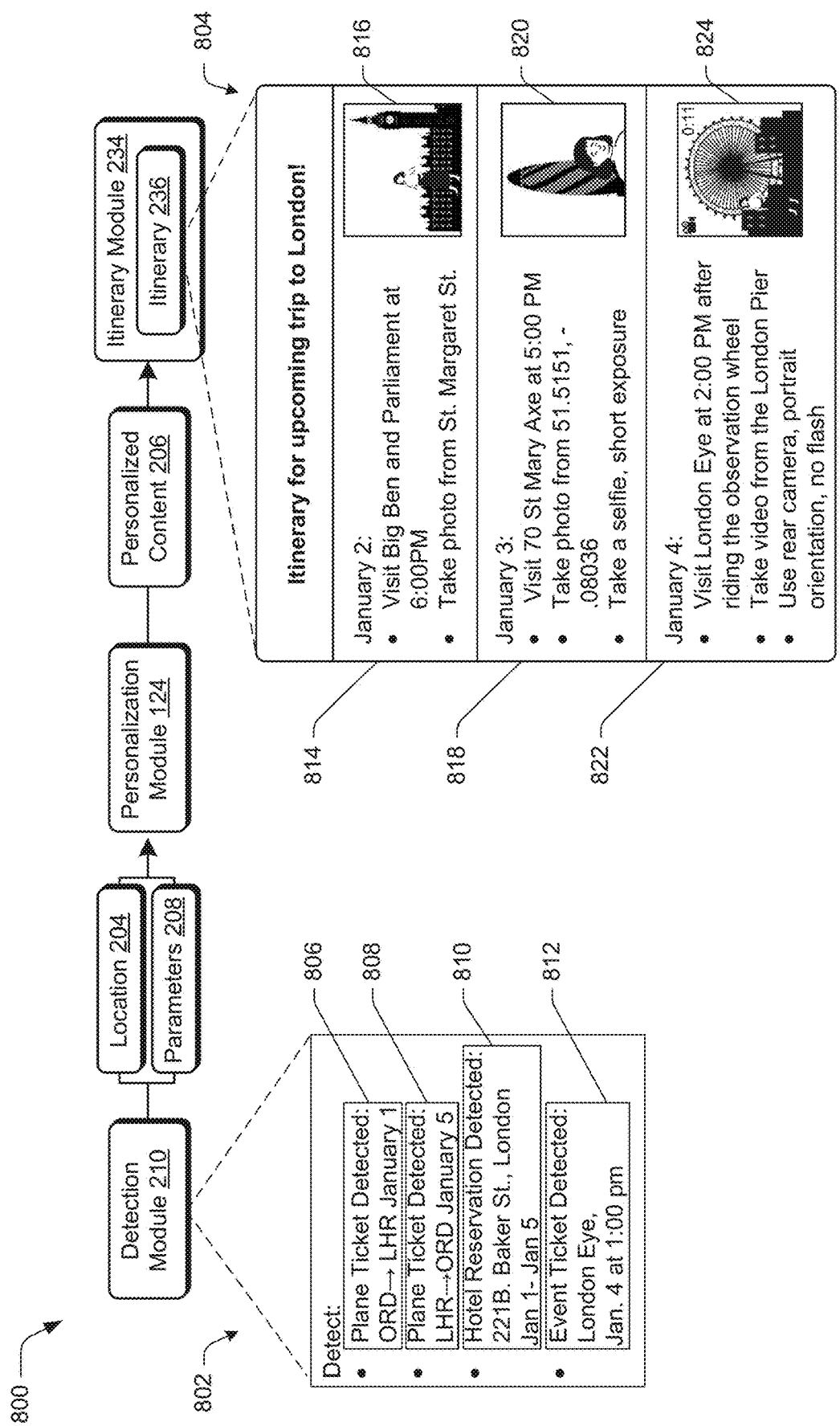
FIG. 8 depicts an example implementation for personalized digital content generation further including generating a personalized itinerary in accordance with one or more implementations.

FIG. 8 illustrates an example implementation 800 for personalized digital content generation further including generating a personalized itinerary in accordance with one or more implementations. In this example, the illustrated in first stage 802 and second stage 804, a user of a client device 102 is planning a trip to London England. A detection module 210 is operable to detect a location 204 as well as various parameters 208. For instance, the detection module 210 is employed to detect destination data including a first plane ticket 806, a second plane ticket 808, a hotel reservation 810, and an event ticket 812. Based on the tickets and reservations, the detection module 210 is operable to determine a location 204, e.g., London, England, as well as extrapolate a period of time to generate an itinerary 236 for the visit for the user, e.g., January $2^{nd}$ through January $4^{th}$. The detection module is further operable to determine that the user will be at a particular destination, e.g., the London Eye, January $4^{th}$ at approximately 1:00 pm based on the event ticket 812.

In accordance with the techniques described above, the personalization module 124 is operable to generate various instances of personalized content 206 based on the parameters 208 that depict the user at scenes around London. Further, as illustrated in second stage 804, the content control module 116 includes an itinerary module 234 that is operable to generate the itinerary 236, e.g., that includes the personalized content 206. The itinerary 236 further includes specified times and specified locations to obtain digital content captures based on the personalized content 206. For instance, in the illustrated example, the itinerary includes a recommendation 814 for January $2^{nd}$ to visit the Big Ben clock tower at a 6:00 PM, as well as an instruction for where to stand to capture an instance of digital content to replicate an instance of personalized content 206 depicted at 816.

Similarly, the itinerary includes a recommendation 818 for January $3^{rd}$ to visit 70 St Mary Ave Axe at 5:00 pm, as well as a suggested geolocation to capture a photograph to replicate an instance of personalized content 206 depicted at 820. The recommendation 818 further includes several suggested device configuration settings to capture the instance of digital content, such as to take capture self-portrait content (e.g., a "selfie) and to use a short exposure. The itinerary further includes a recommendation 822 for January $4^{th}$ for the user to visit the Eye of London at 2:00, e.g., based in part on the detection of the event ticket 812. The recommendation 822 additionally includes a suggestion for where to stand to capture a video to replicate an instance of personalized content 206 depicted at 824. Further, the recommendation 822 includes several suggested device configuration settings to capture the instance of digital content, such as to use a rear camera (e.g., the rear camera of a client device 102 such as a multi-camera mobile device), to position the capture device in a portrait orientation, and to not use a flash. In this way, the techniques described herein further instruct a user where, when, and how to capture content to replicate various personalized digital content as well as provide a visual example of what the content may look like.

Figure 9:
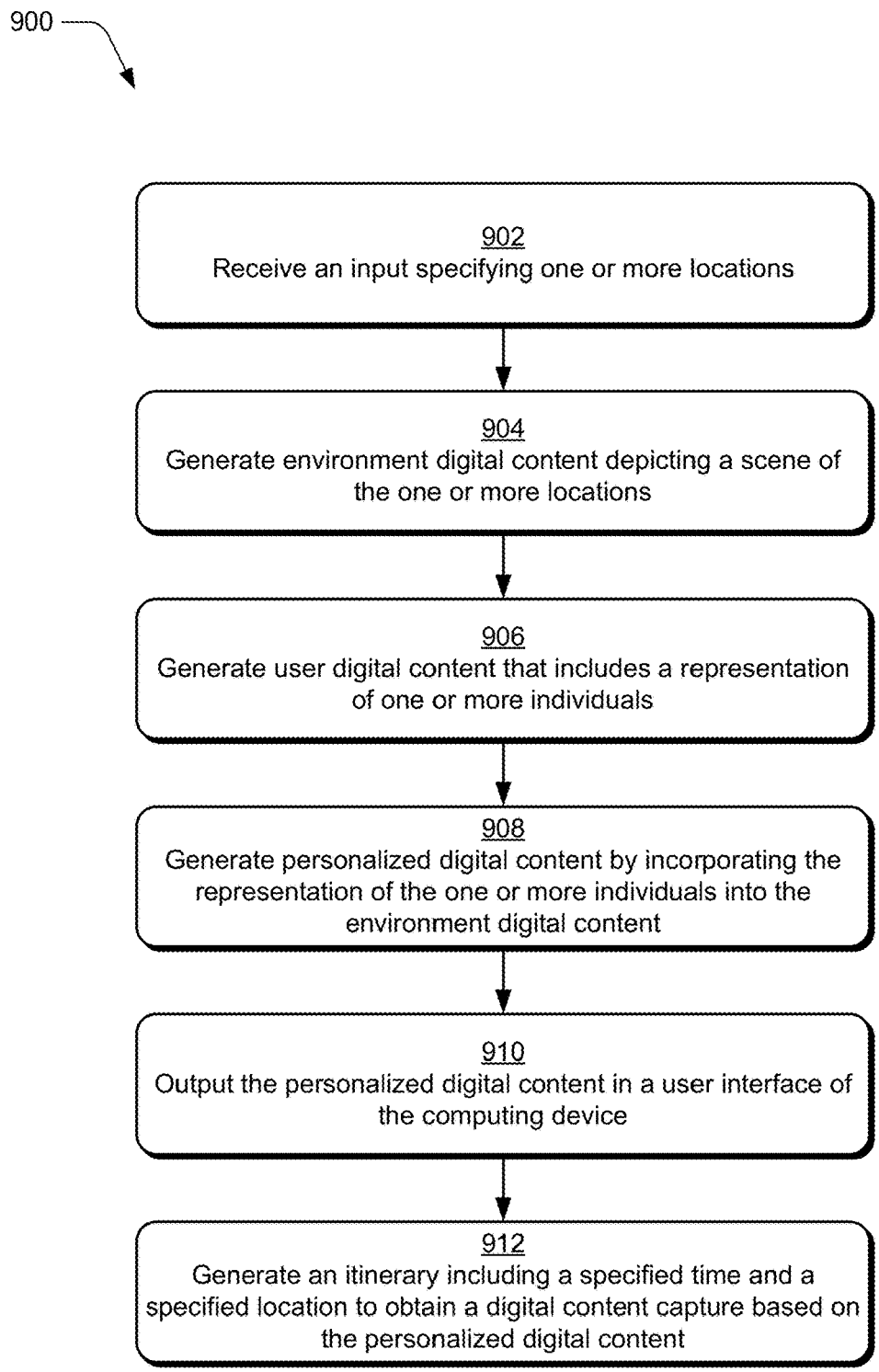
FIG. 9 illustrates a flow chart depicting an example method for personalized digital content generation in accordance with one or more implementations.

FIG. 9 illustrates a flow chart depicting an example method 900 for personalized digital content generation in accordance with one or more implementations. At 902, an input specifying one or more locations in received. The location 204 can be a geographical area (e.g., a country, state, city, etc.), a sight (e.g., a monument, attraction, viewpoint, vista, etc.), an address, GPS coordinates (a "geolocation"), etc. In an example, the location 204 is associated with a search radius, e.g., a distance radius within which the personalized content 206 is to be generated. In some examples, the input further includes additional criteria such as one or more parameters 208 that can be used to generate the personalized content 206 such as times of the day and/or days of the week/month/year, weather conditions, itineraries including the one or more destinations, types/styles of digital content, one or more themes, or a selection of particular individuals to visit the one or more locations. In various examples, the input 202 is based on a user query, e.g., a request by a user in the user interface 114 specifying the location 204 and/or the one or more parameters 208. In alternative or additional examples, the input 202 is detected automatically and without user intervention, e.g., based on an input to mapping application, and/or destination data such as lodging reservations, travel receipts, various preconfigured itineraries, event tickets, search history, transportation reservations, etc.

At 904, environment content depicting a scene of the one or more locations is generated. Generally, the environment content 214 includes instances of digital content (e.g., photos, videos, augmented reality/virtual reality ("AR/VR") content, etc.) that depict a scene of the one or more locations 204. Further, the environment content 214 can be generated in accordance with the parameters 208, e.g., to depict the location 204 at a particular time of day, year, month, etc., in accordance with one or more themes, as including instances of digital content within a search radius, including specified digital content styles and/or types, etc. In one example, the environment content 214 is generated using one or more web-scraping techniques. For instance, the content control module is operable to employ one or more bots and/or web crawlers to obtain various instances of digital content that represent scenes from the one or more locations 204.

At 906, user content is generated that includes a representation of one or more individuals. Generally, the user content 220 represents instances of digital content (e.g., photos, videos, AR/VR content, etc.) that include a representation of one or more individuals. In one example, the user content 220 is obtained as input, e.g., as input by a user in a user interface 114 of a client device 102. In additional or alternative examples, the user content 220 can be collected from a variety of locations, such as via a content database 222 maintained on the client device 102, one or more external databases, social media sites, acquired over the network 118, etc.

At 908, personalized digital content is generated by incorporating the representation of the one or more individuals into the environment digital content. Generally, the personalized content 206 includes at least one instance of digital content that incorporates the one or more individuals from the user content 220 into the one or more scenes depicted by the environment content 214, e.g., such that the personalized digital content makes it look "as if the user were there." In various examples, the personalization module 124 generates the personalized content 206 based in part on the parameters 208, e.g., in accordance with one or more themes. A variety of image processing techniques are considered and employed by the personalization module 124 to generate the personalized content 206.

For instance, in one example an artificial intelligence ("AI") based segmentation algorithm is used to generate the personalized content 206, e.g., to segment portions of the user content 220 and/or the environment content 214. In some implementations, the personalized content 206 is based in part on one or more correspondence scores that represent a degree of similarity between the user content 220 and the environment content 214. In additional or alternative examples, an edit module 228 is employed to adjust visual properties of the environment content 214 and/or the user content 220 as part of generating the personalized content 206. For instance, the edit module 228 is operable to adjust the sizing, location, positioning, contrast, exposure, lighting, resolution, etc. of portions of the environment content 214 and/or the user content 220. In various examples, the edit module 228 is operable to add visual effects and/or features, such as shadows, filters, blending, etc. to the user content 220 and/or the environment content 214. In this way, the user content 220 and the environment content 214 are concatenated with enhanced photorealism.

At 910, the personalized content is output, e.g., in a user interface of the computing device. In various implementations, the personalized content 206 is configured as one or more albums, e.g., based on one or more of the parameters 208. By way of example, multiple albums are generated for display based on multiple themes, e.g., two or more of an educational album, a food album, a nightlife album, an adventure album, etc. In alternative or additional examples, albums are generate based on a time of year, digital content styles, digital content types, etc. In this way, the content control module is further operable to generate digital content that is organized based on various parameters 208.

At 912, in some examples an itinerary is generated including a specified time and a specified location to obtain a digital content capture based on the personalized content. The itinerary 236 also can include instances of the personalized content 206. In various implementations, the itinerary 236 further includes recommended device capture settings to configure the client device 102 to obtain a content capture. For instance, the recommended device configuration settings can include whether to use a front camera or a rear camera of a client device 102, whether to capture digital content in a landscape or portrait orientation, and/or whether/how to apply visual effects such as an aperture size, shutter speed, ISO, brightness settings, flash setting, night mode, exposure setting, image filter, contrast setting, etc. Thus, the techniques described herein further instruct a user where, when, and how to capture content to replicate various instances of personalized content 206.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 10:
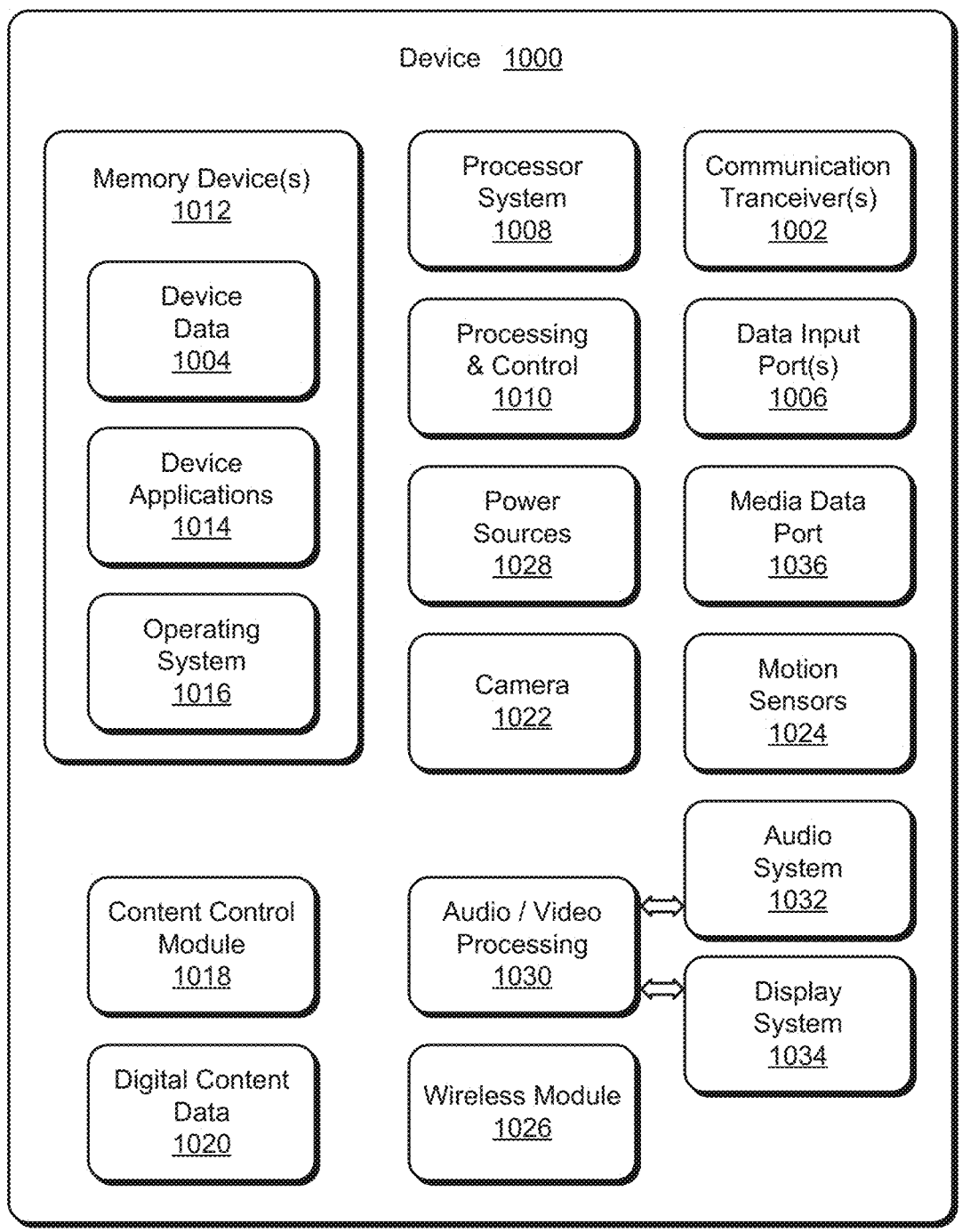
FIG. 10 illustrates various components of an example device in which aspects of personalized digital content generation can be implemented.

FIG. 10 illustrates various components of an example device 1000 in which aspects of personalized digital content generation can be implemented. The example device 1000 can be implemented as any of the devices described with reference to the previous FIGS. 1-9, such as any type of mobile device, mobile phone, mobile device, wearable device, tablet, computing, communication, entertainment, gaming, media playback, and/or other type of electronic device. For example, the client device 102 as shown and described with reference to FIGS. 1-9 may be implemented as the example device 1000.

The device 1000 includes communication transceivers 1002 that enable wired and/or wireless communication of device data 1004 with other devices. The device data 1004 can include any of device identifying data, device location data, wireless connectivity data, and wireless protocol data.

Additionally, the device data 1004 can include any type of audio, video, and/or image data. Example communication transceivers 1002 include wireless personal area network (WPAN) radios compliant with various IEEE 1002.15 (Bluetooth™) standards, wireless local area network (WLAN) radios compliant with any of the various IEEE 1002.11 (Wi-Fi™) standards, wireless wide area network (WWAN) radios for cellular phone communication, wireless metropolitan area network (WMAN) radios compliant with various IEEE 1002.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random-access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on. Computer-readable storage memory 1012 represents media and/or devices that enable persistent and/or non-transitory storage of information in contrast to mere signal transmission, carrier waves, or signals per se. Computer-readable storage memory 1012 do not include signals per se or transitory signals.

In this example, the device 1000 includes a content control module 1018 that implements aspects of personalized digital content generation and may be implemented with hardware components and/or in software as one of the device applications 1014. In an example, the content control module 1018 can be implemented as the content control module 116 described in detail above. In implementations, the content control module 1018 may include independent processing, memory, and logic components as a computing and/or electronic device integrated with the device 1000. The device 1000 also includes digital content data 1020 for implementing aspects of personalized digital content generation and may include data from and/or utilized by the content control module 1018.

In this example, the example device 1000 also includes a camera 1022 and motion sensors 1024, such as may be implemented in an inertial measurement unit (IMU). The motion sensors 1024 can be implemented with various sensors, such as a gyroscope, an accelerometer, and/or other types of motion sensors to sense motion of the device. The various motion sensors 1024 may also be implemented as components of an inertial measurement unit in the device.

The device 1000 also includes a wireless module 1026, which is representative of functionality to perform various wireless communication tasks. For instance, for the client device 102, the wireless module 1026 can be leveraged to scan for and detect wireless networks, as well as negotiate wireless connectivity to wireless networks for the client device 102. The device 1000 can also include one or more power sources 1028, such as when the device is implemented as a mobile device. The power sources 1028 may include a charging and/or power system, and can be implemented as a flexible strip battery, a rechargeable battery, a charged super-capacitor, and/or any other type of active or passive power source.

The device 1000 also includes an audio and/or video processing system 1030 that generates audio data for an audio system 1032 and/or generates display data for a display system 1034. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1036. In implementations, the audio system and/or the display system are integrated components of the example device. Alternatively, the audio system and/or the display system are external, peripheral components to the example device.

Although implementations of personalized digital content generation have been described in language specific to features and/or methods, the subject of the appended claims is not necessarily limited to the specific features or methods described. Rather, the features and methods are disclosed as example implementations of personalized digital content generation, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

In some aspects, the techniques described herein relate to a computing device, including: a content control module implemented at least partially in hardware and configured to: receive an input including one or more locations; generate environment digital content depicting a scene of the one or more locations; generate user digital content that includes a representation of one or more individuals; generate personalized digital content by incorporating the representation of the one or more individuals into the environment digital content; and output the personalized digital content in a user interface of the computing device.

In some aspects, the techniques described herein relate to a computing device, wherein the environment digital content is generated using web-scraping techniques to compile instances of digital content associated with the one or more locations.

In some aspects, the techniques described herein relate to a computing device, wherein the content control module is configured to segment portions of the environment digital content using an artificial intelligence based segmentation algorithm to generate the personalized digital content.

In some aspects, the techniques described herein relate to a computing device, wherein the personalized digital content is generated by adjusting one or more visual properties of the environment digital content and the user digital content.

In some aspects, the techniques described herein relate to a computing device, wherein the environment digital content and the personalized digital content are generated based in part on a user specified theme.

In some aspects, the techniques described herein relate to a computing device, wherein the input is based on a user query that includes the one or more locations.

In some aspects, the techniques described herein relate to a computing device, wherein the user query includes one or more parameters, and wherein the environment digital content is generated based on the one or more parameters.

In some aspects, the techniques described herein relate to a computing device, wherein the one or more parameters include a time of year, a time of day, or a selection of individuals to visit the one or more locations.

In some aspects, the techniques described herein relate to a computing device, wherein the content control module is configured to remove a background from the user digital content to extract the representation of the one or more individuals as part of generating the personalized digital content.

In some aspects, the techniques described herein relate to a method, including: detecting, automatically and without user intervention, destination data indicating travel to one or more locations; generating environment digital content depicting scenes of the one or more locations and user digital content including representations of one or more individuals; generating personalized digital content by incorporating the representations of the one or more individuals into the scenes of the one or more locations; generating a personalized digital content album including a plurality of instances of the personalized digital content; and outputting the personalized digital content album in a user interface of a client device.

In some aspects, the techniques described herein relate to a method, wherein the destination data includes one or more of a lodging reservation, travel receipts, event tickets, or a transportation reservation.

In some aspects, the techniques described herein relate to a method, wherein the personalized digital content album is generated based on a specified theme.

In some aspects, the techniques described herein relate to a method, wherein the specified theme includes one or more of a food theme, a historical theme, an educational theme, a nightlife theme, a family friendly theme, or an adventurous theme.

In some aspects, the techniques described herein relate to a method, wherein the environment digital content is generated using web-scraping to compile instances of digital content associated with the one or more locations.

In some aspects, the techniques described herein relate to a method, wherein the personalized digital content is generated using an artificial intelligence-based segmentation algorithm to segment portions of the environment digital content and the user digital content.

In some aspects, the techniques described herein relate to a method, further including obtaining a plurality of instances of the user digital content, determining correspondence scores for the plurality of instances of the user digital content to the environment digital content, and wherein generating the personalized digital content is based in part on the correspondence scores.

In some aspects, the techniques described herein relate to a computing device, including: a content control module implemented at least partially in hardware and configured to: receive an input including one or more locations; generate environment digital content based on the one or more locations and user digital content including a representation of one or more individuals; generate personalized digital content by incorporating the representation of the one or more individuals into one or more instances of the environment digital content; generate an itinerary including a specified time and a specified location to obtain a digital content capture based on the personalized digital content; and outputting the itinerary in a user interface of the computing device.

In some aspects, the techniques described herein relate to a computing device, wherein the itinerary further includes a representation of the personalized digital content.

In some aspects, the techniques described herein relate to a computing device, wherein the specified time and specified location represent an optimal time and location to obtain the digital content capture.

In some aspects, the techniques described herein relate to a computing device, wherein the itinerary further includes one or more suggested device configuration settings to obtain the digital content capture.

The invention claimed is:

1. A computing device, comprising:
a content control module implemented at least partially in hardware and configured to:
receive an input including destination data that indicates upcoming travel to one or more locations;
generate environment digital content depicting a scene of the one or more locations;
generate user digital content that includes a representation of one or more individuals;
generate personalized digital content by incorporating the representation of the one or more individuals into the environment digital content, the personalized digital content generated based in part on a correspondence score that represents a degree of similarity between the user digital content and the environment digital content; and output the personalized digital content in a user interface of the computing device.

2. The computing device as described in claim 1, wherein the environment digital content is generated using web-scraping techniques to compile instances of digital content associated with the one or more locations.

3. The computing device as described in claim 1, wherein the content control module is configured to segment portions of the environment digital content using an artificial intelligence based segmentation algorithm to generate the personalized digital content.

4. The computing device as described in claim 1, wherein the personalized digital content is generated by adjusting one or more visual properties of the environment digital content and the user digital content.

5. The computing device as described in claim 1, wherein the environment digital content and the personalized digital content are generated based in part on a user specified theme.

6. The computing device as described in claim 1, wherein the input is based on a user query that includes the one or more locations.

7. The computing device as described in claim 6, wherein the user query includes one or more parameters, and wherein the environment digital content is generated based on the one or more parameters.

8. The computing device as described in claim 7, wherein the one or more parameters include a time of year, a time of day, or a selection of individuals to visit the one or more locations.

9. The computing device as described in claim 1, wherein the content control module is configured to remove a background from the user digital content to extract the representation of the one or more individuals as part of generating the personalized digital content.

10. A method, comprising:
    detecting, automatically and without user intervention, destination data that includes digital content that indicates upcoming travel to one or more locations;
    generating environment digital content depicting scenes of the one or more locations and user digital content including representations of one or more individuals;
    generating personalized digital content by incorporating the representations of the one or more individuals into the scenes of the one or more locations, the personalized digital content generated based in part on a visual correspondence between the user digital content and the environment digital content;
    generating a personalized digital content album including a plurality of instances of the personalized digital content; and
    outputting the personalized digital content album in a user interface of a client device.

11. The method as described in claim 10, wherein the destination data includes one or more of a lodging reservation, travel receipts, event tickets, or a transportation reservation.

12. The method as described in claim 10, wherein the personalized digital content album is generated based on a specified theme.

13. The method as described in claim 12, wherein the specified theme includes one or more of a food theme, a historical theme, an educational theme, a nightlife theme, a family friendly theme, or an adventurous theme.

14. The method as described in claim 10, wherein the environment digital content is generated using web-scraping to compile instances of digital content associated with the one or more locations.

15. The method as described in claim 10, wherein the personalized digital content is generated using an artificial intelligence-based segmentation algorithm to segment portions of the environment digital content and the user digital content.

16. The method of claim 10, wherein the visual correspondence is determined based on a correspondence score that represents a degree of similarity between the user digital content and the environment digital content, the correspondence score based on metadata associated with the user digital content and metadata associated with the environment digital content.

17. A computing device, comprising:
    a content control module implemented at least partially in hardware and configured to:
    receive an input including destination data that indicates upcoming travel to one or more locations;
    generate environment digital content based on the one or more locations and user digital content including a representation of one or more individuals;
    generate personalized digital content by incorporating the representation of the one or more individuals into one or more instances of the environment digital content;
    generate an itinerary that includes a specified time, a specified location, and one or more specified device configuration settings to obtain a digital content capture to replicate a visual appearance of an instance of the personalized digital content; and
    outputting the itinerary in a user interface of the computing device.

18. The computing device of claim 17, wherein the itinerary further includes a representation of the personalized digital content.

19. The computing device of claim 17, wherein the specified time and specified location represent an optimal time and location to obtain the digital content capture.

20. The computing device of claim 17, wherein the one or more specified device configuration settings to obtain the digital content capture include one or more of a suggested aperture size, flash setting, exposure setting, or contrast setting.

* * * * *